US012054966B2

(12) United States Patent
Corwin, Jr. et al.

(10) Patent No.: US 12,054,966 B2
(45) Date of Patent: Aug. 6, 2024

(54) DOOR POSITION SENSOR FOR AN ELECTROMAGNETIC DOOR LOCK

(71) Applicant: Hanchett Entry Systems, Inc., Phoenix, AZ (US)

(72) Inventors: Larry Gene Corwin, Jr., Mesa, AZ (US); Darik Jay, Gilbert, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 216 days.

(21) Appl. No.: 17/065,161

(22) Filed: Oct. 7, 2020

(65) Prior Publication Data

US 2021/0017789 A1    Jan. 21, 2021

Related U.S. Application Data

(63) Continuation of application No. 15/486,945, filed on Apr. 13, 2017, now abandoned.

(Continued)

(51) Int. Cl.

| | |
|---|---|
| ***E05B 15/02*** | (2006.01) |
| ***E05B 17/20*** | (2006.01) |
| ***E05B 47/00*** | (2006.01) |
| ***E05B 63/00*** | (2006.01) |
| ***E05C 17/56*** | (2006.01) |

(Continued)

(52) U.S. Cl.

CPC ........ *E05B 15/022* (2013.01); *E05B 17/2084* (2013.01); *E05B 47/0002* (2013.01); *E05C 19/166* (2013.01); *E05B 2015/0465* (2013.01); *E05B 2047/0065* (2013.01); *E05B 2047/0068* (2013.01); *E05B 63/0056* (2013.01); *E05C 17/56* (2013.01); *E05C 19/168* (2013.01);

(Continued)

(58) Field of Classification Search

CPC ................ E05B 17/06; E05B 47/0002; E05B 2015/0465; E05B 2047/0065; E05B 2047/0068; E05B 15/022; E05B 17/2084; E05B 63/0056; Y10T 292/11; Y10S 292/65; Y10S 292/60; E05C 19/166; E05C 19/16; E05C 19/168

See application file for complete search history.

(56) References Cited

U.S. PATENT DOCUMENTS

| | | | | |
|---|---|---|---|---|
| 2,801,870 A * | 8/1957 | Davey | .................... | E05C 19/16<br>292/DIG. 71 |
| 3,510,154 A | 5/1970 | Sheff | | |

(Continued)

*Primary Examiner* — Alyson M Merlino

(74) *Attorney, Agent, or Firm* — Woods Oviatt Gilman LLP; Dennis B. Danella, Esq.

(57) ABSTRACT

A door position sensor of an electromagnetic door lock. The electromagnetic lock also includes an electromagnet and a strike plate. The electromagnet is secured to the door frame and the strike plate is movably mounted to the door so that a controlled amount of door movement in the opening direction is permitted while the strike plate remains in contact with an energized electromagnet. The door position sensor may comprise a sensor in or on the electromagnet and a permanent magnet mounted to the door and disposed in proximity to the sensor when the door is in a closed position. The sensor may be a reed switch or a Hall Effect sensor. The permanent magnet and strike plate may be mounted to the door by a mounting tray. The mounting tray may include indicia to aid in providing a proper alignment of the strike plate to the door and electromagnet.

15 Claims, 8 Drawing Sheets

Related U.S. Application Data

(60) Provisional application No. 62/381,387, filed on Aug. 30, 2016, provisional application No. 62/322,344, filed on Apr. 14, 2016.

(51) Int. Cl.
*E05C 19/16* (2006.01)
*E05B 15/04* (2006.01)

(52) U.S. Cl.
CPC ........ *Y10T 292/0908* (2015.04); *Y10T 292/11* (2015.04); *Y10T 292/696* (2015.04)

(56) References Cited

U.S. PATENT DOCUMENTS 4,045,063 A 8/1977 Fletcher et al.
4,063,373 A 12/1977 Greer et al.
4,516,114 A 5/1985 Cook
4,691,952 A 9/1987 Harmon
4,720,128 A 1/1988 Logan, Jr. et al.
4,915,431 A 4/1990 Bailey
4,981,312 A * 1/1991 Frolov .................. E05C 19/168 248/602
5,016,929 A 5/1991 Frolov
5,141,271 A * 8/1992 Geringer ............... E05C 19/166 292/251.5
5,184,855 A * 2/1993 Waltz .................... E05C 19/168 292/341.16
5,184,856 A * 2/1993 Waltz .................... E05C 19/168 292/144
5,641,187 A * 6/1997 Frolov .................. E05C 19/166 292/251.5
5,758,913 A 6/1998 Roth et al.
6,135,515 A * 10/2000 Roth ..................... E05C 19/166 292/DIG. 55
6,271,751 B1 8/2001 Hunt et al.
6,609,738 B1 8/2003 Roth et al.
6,722,715 B1 * 4/2004 Chiang ................. E05C 19/168 292/DIG. 62
7,770,947 B2 * 8/2010 Huang .................. E05C 19/168 292/341.16
8,094,017 B2 1/2012 Hunt et al.
8,292,337 B2 10/2012 Chang
8,820,803 B2 9/2014 Hunt et al.
9,062,481 B2 * 6/2015 Liao ...................... E05C 19/166
9,341,007 B2 * 5/2016 Liao ...................... E05C 19/166
10,190,333 B2 1/2019 Corwin, Jr. et al.
2004/0195846 A1 * 10/2004 Chang ................... E05C 19/168 292/340
2007/0283528 A1 * 12/2007 McDaniel ................. E06B 7/28 16/221
2009/0174553 A1 * 7/2009 Chang ..................... E05B 17/10 340/545.3
2013/0127260 A1 5/2013 Webb et al.
2013/0229020 A1 * 9/2013 Liao ...................... E05C 19/166 292/251.5
2014/0191517 A1 * 7/2014 Liao ...................... E05C 19/166 292/251.5
2014/0225692 A1 * 8/2014 Liao ...................... E05C 19/166 335/279
2015/0259958 A1 * 9/2015 Liao ...................... E05C 19/166 335/281

* cited by examiner

DOOR POSITION SENSOR FOR AN ELECTROMAGNETIC DOOR LOCK

RELATIONSHIP TO OTHER APPLICATIONS AND PATENTS

The present application is a continuation of U.S. patent application Ser. No. 15/486,945, filed Apr. 13, 2017, which claims the benefit of U.S. Provisional Patent Application No. 62/322,344, filed Apr. 14, 2016 and U.S. Provisional Patent Application No. 62/381,387, filed Aug. 30, 2016, the contents of which are incorporated by reference in their entirety.

TECHNICAL FIELD

The present invention relates to a door position sensor of an electromagnetic door lock wherein the electromagnetic door lock secures a door to a door frame in a closed position. The electromagnetic lock also includes an electromagnet and a strike plate. The electromagnet is secured to the door frame and the strike plate is movably mounted to the door so that a controlled amount of door movement in the opening direction is permitted while the strike plate remains in contact with an energized electromagnet. The door position sensor may comprise a sensor in or on the electromagnet and a permanent magnet mounted to the door and disposed in proximity to the sensor when the door is in a closed position. The sensor may be a reed switch or a Hall Effect sensor, whereby the sensor monitors initial door movement away from the door frame. In one aspect of the invention, the permanent magnet and movably mounted strike plate may be mounted to the door by way of a mounting tray. The mounting tray may include indicia to aid in providing a proper alignment of the strike plate to the door and electromagnet. In the case of an electromagnetic door lock equipped with an Eco-Mag design feature, the door position sensor may be used to determine whether additional power should be provided to the electromagnet to secure the lock in a locked state and prevent unwanted opening of the door. The door position sensor may also be used in conjunction with an electromagnetic door lock having a De-Mag design feature to determine when a "delay period" should be initiated.

BACKGROUND OF THE INVENTION

Electromagnetic door locks are widely used in diverse electronic door applications. These locks typically use electromagnets attached to the door frame in conjunction with a ferromagnetic strike plate attached to the door, to hold the door firmly closed. When the electromagnet is energized and is in contact with the strike plate, the strike plate becomes an armature for the electromagnet, thus providing a mechanism for locking the door to the frame.

In current designs such as disclosed in U.S. Pat. No. 5,758,913, means are provided in the electromagnetic door lock to permit a controlled amount of door movement in the opening direction while the armature or strike plate of the lock remains in contact with an energized electromagnet, to improve the ability of a door equipped with an electromagnetic lock to withstand a physical blow. This design feature of the electromagnetic door lock is referred to herein as an "Energy Absorbing" design feature. A coil spring allows for some relative movement between the door and strike plate. The coil spring provides linear elasticity to the door by absorbing some of the kinetic energy of the blow upon compression of the spring, thus lowering the peak force experienced to separate the strike plate from the armature during a physical attack against the door and allowing for a lower powered electromagnet to be used.

In other current electromagnetic door lock designs, there may also exist a means that momentarily delays de-energizing of the electromagnet after a force to open the door is applied. The application of an opening force is detected by sensing when initial door movement away from the door frame is detected using a suitable door position sensor. This design feature is often associated with exit doors in commercial buildings or restaurants that permit emergency egress through doors normally locked. In a delayed electromagnetic door lock ("De-Mag" design feature), if an opening force is applied to a locked door continuously through a first predetermined period of time (the "delay period"), the electromagnet will be de-energized, allowing the door to be opened. If the opening force applied to the door is terminated within a second predetermined period of time (the "nuisance delay period") wherein the second predetermined period of time is less than the first predetermined period of time, the electromagnet will remain energized and the door will remain locked. Typically, an audible signal will be sounded when initial door movement is detected providing an alarm that an attempt is being made to exit through the locked door.

In still other current electromagnetic door lock designs, there may exist a power savings design feature (Eco-Mag design feature). By the Eco-Mag design feature, the electromagnet has a resting state wherein only enough power is supplied to the electromagnet to keep the door in a locked state when subjected to only environmental stimuli, such as a gust of wind. Then, should a more forceful attempt be made to open the door (i.e., an unauthorized attempt to enter/exit), power to the electromagnet is increased to keep the door locked against the unauthorized attempt to open the door. The Eco-Mag design feature also requires the use of a suitable door position sensor to detect when a controlled amount of initial door movement in the door-opening direction has occurred, thereby sensing when an unauthorized attempt to enter is being made.

Door position sensors used in conjunction with De-Mag or Eco-Mag designs may generally be comprised of at least one permanent magnet connected to the strike plate and a sensor mounted within the electromagnet, wherein the sensor is responsive to initial movement of the strike plate away from the electromagnet.

Door position sensors of the above type, when used in conjunction with electromagnetic door locks having means to permit a controlled amount of door movement in the opening direction while the strike plate remains in contact with an energized electromagnet, require an excessive amount of door movement in the opening direction before a "door-opening" condition is signaled. This is because the coil spring needed to provide a controlled amount of door movement must first be compressed a given distance, then the strike plate must begin to move away from the electromagnet before the "door-opening signal is generated. This excessive amount of door movement is undesirable because the excessive movement creates a false impression to the user that the door is not entirely secured.

What is needed in the art is a door position sensor used in conjunction with an electromagnetic door lock that senses initial movement of the door away from the door frame and not movement of the strike plate away from the electromagnet, thereby providing a more sensitive and robust way of detecting initial door movement in De-Mag or Eco-Mag architectures.

What is also needed is a door position sensor that can detect initial movement of the door away from the door frame within about ⅛ inch of movement.

What is needed further in the art is a strike plate mountable to a tray wherein the at least one magnet of a door position sensor is contained by the tray, thereby providing for a more compact and convenient package that may be used in with De-Mag and Eco-Mag architectures.

It is the principal object of the present invention to provide this and other needs.

SUMMARY OF THE INVENTION

Briefly described, the present invention is directed toward a door position sensor for use in conjunction with an electromagnetic door lock for securing a door to a door frame, wherein the electromagnetic door lock includes a strike plate assembly and an electromagnet and wherein a strike plate of the strike plate assembly is magnetically held in contact with the electromagnet when the electromagnet is energized to secure the door to the door frame. The door position sensor includes a sensor connectable to the door frame, and a permanent magnet fixably connectable to the door, wherein movement of the door away from the door frame is detected by the door position sensor while the strike plate is held in contact with the electromagnet.

The sensor may be a Hall Effect sensor or a reed switch. The sensor may be on or in the electromagnet.

With the aforementioned door position sensor, movement of the door away from the door frame may be less than about ¾ inches. In one aspect of the invention, movement of the door away from the door frame is within the first ⅛ inches of door movement away from the door frame.

The door position sensor may also include a second permanent magnet fixably connected to the door with a second sensor connectable to the door frame to form a second door position sensor, wherein movement of the door away from the door frame is detected by at least one of the door position sensors while the strike plate is held in contact with the electromagnet.

The door position sensor may further include a strike tray having a cavity defined by the strike tray and fixably connectable to the door, wherein the permanent magnet is integrally mounted to the strike tray and wherein the cavity is proportioned to receive the strike plate. Further, a second permanent magnet may be integrally mounted to the strike tray with a second sensor connectable to the door frame to form a second door position sensor, and wherein movement of the door away from the door frame is detected by at least one of the door position sensors while the strike plate is held in contact with the electromagnet.

The aforementioned strike tray may also include indicia to aid in the proper positioning of the strike plate relative to the electromagnet. The strike tray of the door position sensor may also include a wall wherein when the strike plate is received in the cavity, the strike plate abuts the wall to align the strike plate with the electromagnet. In a further aspect of the invention, the cavity may be defined by at least one wall or at least one edge for receiving the strike plate.

In a further aspect of the invention, an electromagnetic door lock is provided for selectively locking and unlocking a door to a door frame where the door is pivotally coupled to the door frame. Further, the electromagnetic lock includes an electromagnet mountable to the door frame and a strike plate configured to be mounted to the door. Still further, the electromagnetic door lock includes a door position sensor having a permanent magnet fixably connectable to the door and a sensor on or in the electromagnet, wherein movement of the door away from the door frame is detected by the door position sensor while the strike plate is held in contact with the electromagnet when energized.

The sensor of the aforementioned electromagnetic door lock may be a Hall Effect sensor or a reed switch.

Still further, with the aforementioned electromagnetic door lock, movement of the door away from the door frame is less than about ¾ inches. In a further aspect of the invention, movement of the door away from the door frame is within the first ⅛ inches of door movement away from the door frame.

Further the door position sensor of the aforementioned electromagnetic door lock may include a second permanent magnet fixably connected to the door and a second sensor on or in the electromagnet to form a second door position sensor, wherein movement of the door away from the door frame is detected by at least one of the door position sensors while the strike plate is held in contact with the electromagnet.

The door position sensor of the aforementioned electromagnetic door lock may further include a strike tray having a cavity defined by the strike tray, wherein the strike tray is fixably connectable to the door, wherein the permanent magnet is integrally mounted to the strike tray and wherein the cavity is proportioned to receive the strike plate. Further, a second permanent magnet may be integrally mounted to the strike tray and a second sensor may be connectable to the door frame to form a second door position sensor, wherein movement of the door away from the door frame is detected by at least one of the door position sensors while the strike plate is held in contact with the electromagnet.

Further, the aforementioned strike tray may include indicia to aid in the proper positioning of the strike plate relative to the electromagnet. Also, the strike tray may include a wall wherein when the strike plate is received in the cavity, the strike plate abuts the wall to align the strike plate with the electromagnet. Further, the aforementioned cavity may be defined by at least one wall or at least one edge for receiving the strike plate.

Numerous applications, some of which are exemplarily described below, may be implemented using the present invention.

DETAILED DESCRIPTION OF THE PREFERRED EMBODIMENT

Figure 1:
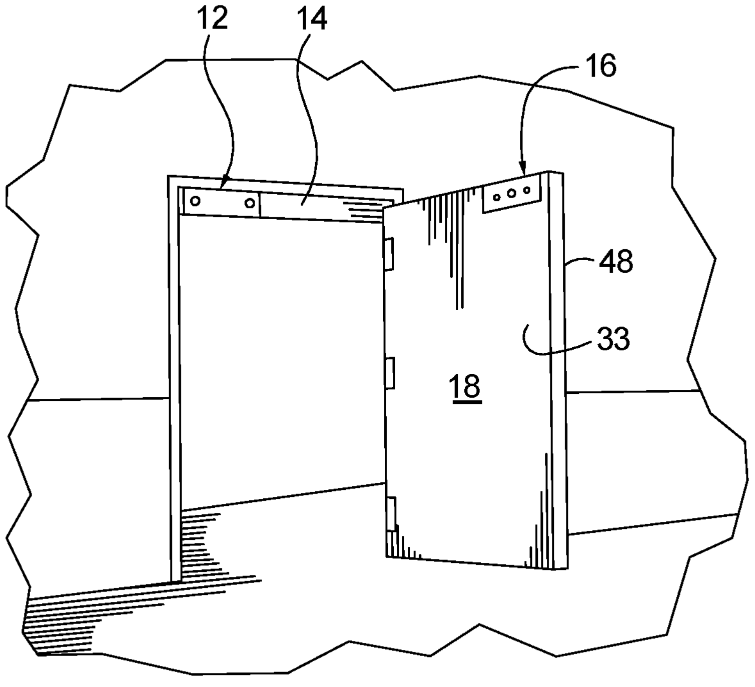
FIG. 1 shows a typical electromagnetic door lock installation.

FIG. 1 shows a typical electronic door lock installation. In a typical installation, an electromagnet 12 is secured to a door frame 14. A ferromagnetic armature or strike plate 16 is mounted on front face 33 of door 18. When door 18 is closed and electromagnet 12 is energized, electromagnet 12 exerts a magnetic force against strike plate 16 to hold door 18 in a closed and magnetically locked position.

Figure 2:
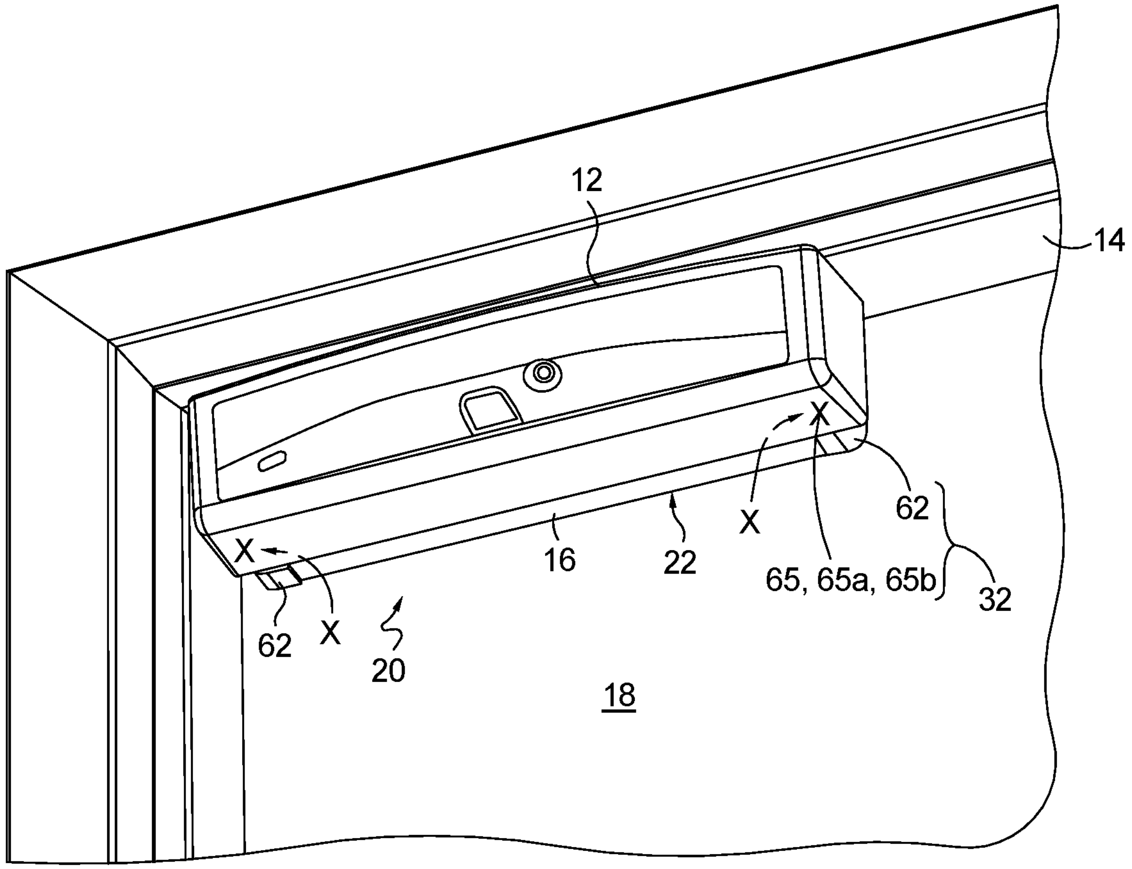
FIG. 2. PRIOR ART
FIG. 2 is a plan view of an electromagnetic door lock, including a strike plate and permanent magnets connected to sides of the strike plate as in the prior art.
Figure 3:
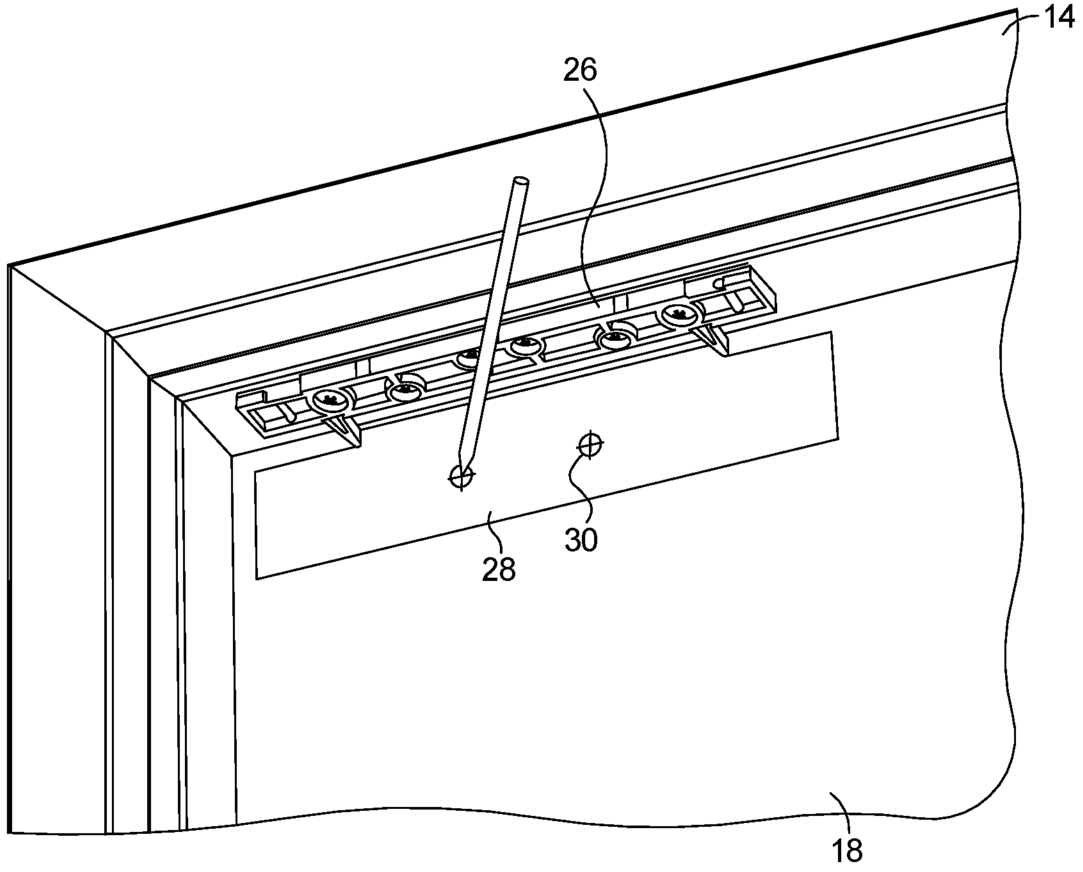
FIG. 3. PRIOR ART
FIG. 3 is a plan view of a mounting bracket for the electromagnet and a template used in mounting the strike plate to a door as in the prior art.
Figure 4:
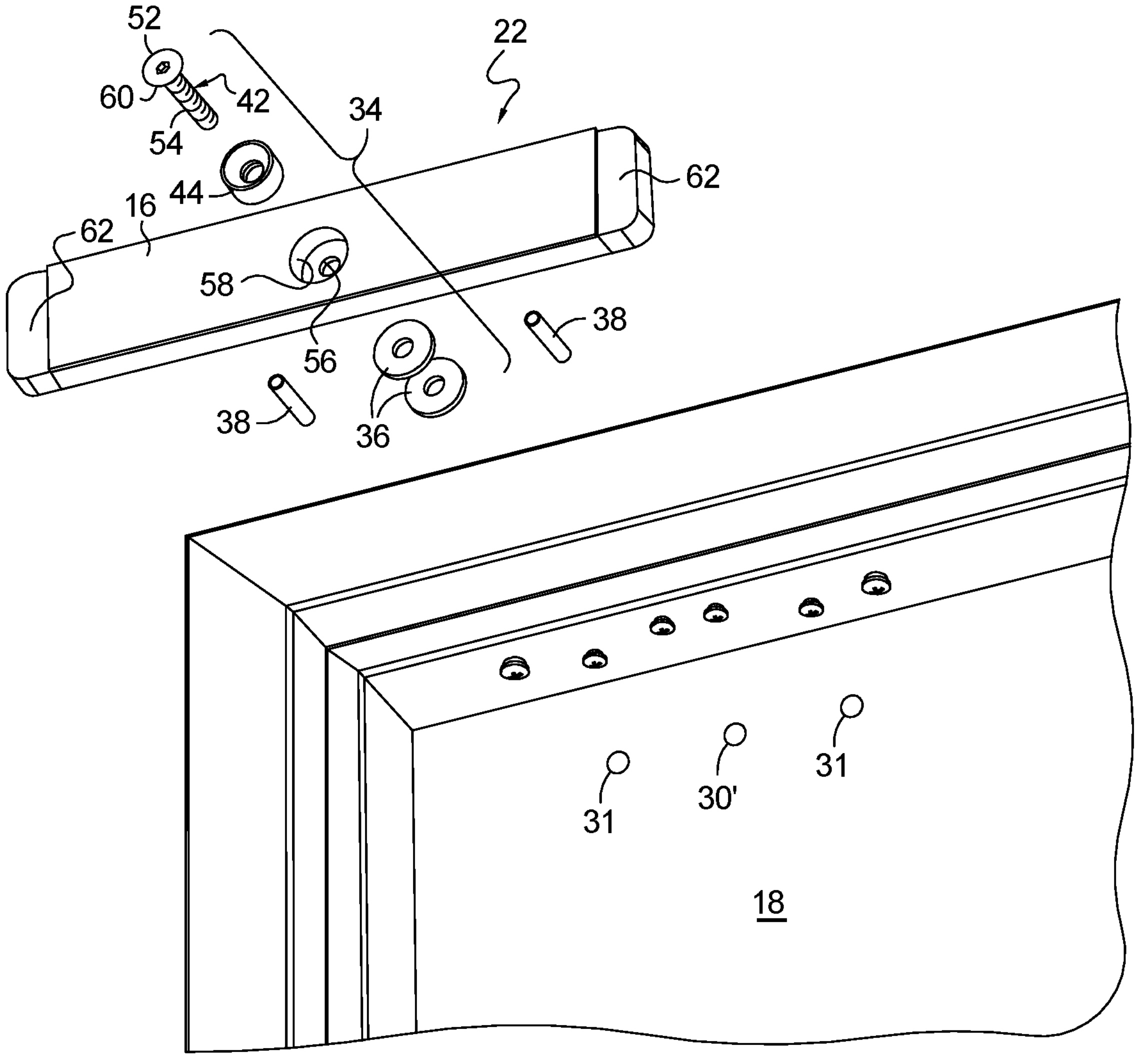
FIG. 4 is an exploded perspective view of the strike plate with the at least one permanent magnet connected to the strike plate and the strike plate mounting bolt assembly used to movably mount the strike plate to the door.

FIGS. 2 through 4 show electromagnetic lock 20 comprised generally of an electromagnet 12 and strike assembly 22 which includes strike plate 16 and permanent magnets 62 connected to ends of strike plate 16. A prior art door position sensor 32 as shown as shown in FIG. 2 includes permanent magnet 62 connected to strike plate 16 and sensor 65 on or in electromagnet 12 wherein magnet 62 is disposed in proximity to sensor 65 when the door is closed. With reference to FIG. 3, as disclosed in commonly owned U.S. Patent Publication No. 2013/0127260, electromagnet 12 may be mounted onto a door frame 14 via electromagnet mounting bracket 26 or other mounting means. A template 28 may be mounted to door 18 and keyed to reference mounting bracket 26 so as to indicate proper placement and hole sizes and depths for drilling pilot holes 30 used in mounting strike plate. Permanent magnet 62 is used to sense the proximity of strike plate 16 to electromagnet 12 and, in conjunction with sensor 65 in or on the electromagnet, form door position sensor assembly 32. Note that, since the permanent magnet 62 is connected directly to the strike plate, door position sensor 32 of the prior art detects only the movement of magnet 62, and therefore strike plate 16, away from electromagnet 12. Sensor 32 does not sense initial movement of the door away from the door frame while the strike plate remains in contact with an energized electromagnet.

Turning further to FIG. 4, an exploded view of the device described in reference to FIG. 2 is shown. Included in FIG. 4 is strike assembly 22, including strike plate 16 and permanent magnets 62 connected to ends of strike plate 16. FIG. 4 also depicts an exploded view of strike plate strike plate mounting bolt assembly for movably mounting the strike plate to the door, as disclosed in commonly owned U.S. Provisional Application Ser. No. 62/322,344, hereby incorporated by reference. Strike assembly 22 including strike plate 16 and one or more permanent magnets 62, is movably mounted to door 18 via strike plate mounting bolt assembly 34. One or more flexible washers 36 may be included to allow strike plate 16 to move, to a degree, so that strike plate 16 can abut the electromagnet in full contact for maximum hold force when door 18 is shut and the electromagnet is energized. Guide pins 38 are mounted in holes 31 in the door whereby pins 38 may slideably mate with corresponding holes in the strike plate (not shown) so as to keep the strike plate in proper alignment with the door through the strike plate's movement relative to the door. Strike plate mounting bolt assembly 34 may include a bolt (see e.g., bolt 40 in FIG. 6A), post 42 and a resilient member 44. In one aspect of the invention, resilient member 44 is a Belleville washer assembly composed of at least one Belleville washer. As seen in FIG. 6A, bolt 40 may include a flange or head 46 which abuts the rear face 48 of door 18 (see FIG. 1), and a shaft 50. Through bore 30', formed in door 18, is sized to receive an outer diameter of shaft 50. Head 46 of bolt 40 may be configured to be tamper-resistant from its exposed end.

Returning to FIG. 4, post 42 includes head end 52 and shaft end 54 wherein the head end is larger in diameter than the shaft end. Male threads formed in shaft end 54 are configured for engagement with female threads in bolt 40. Strike plate 16 includes first bore 56 and second bore 58 larger in diameter than first bore 56. First bore 56 is sized to loosely receive shaft end 54 of post 42. Second bore 58 forms a cavity for receiving resilient member 44 which may be comprised of one more individual Belleville washers. Each Belleville washer may be dimensioned to have an outer diameter smaller than a diameter of second bore 58 and a center hole larger in diameter than the outer diameter of shaft end 54 of post 42.

To complete the assembly of the strike plate to the door, bolt 40 is inserted into through bore 30' defined within door 18. After inserting the shaft end 54 of post 42 through each bore of the at least one Belleville washers, shaft end 54 is inserted through first and second bores 56, 58 of strike plate 16. Male threads on shaft end 54 are then threaded into female threads within bolt 40. Post 42 is then tightened into bolt 40 until opposing surfaces of the at least one Belleville washer are in contact with second bore surface 58 and the underside of head end 52 of post 42 and, preferable, until post head end 52 is flush or below the outer surface of the strike plate 16.

As described in commonly owned U.S. Provisional Application Ser. No. 62/322,344, selective stacking of two or more Belleville washers (Belleville washer assembly 44) may be utilized to tune the load/deflection characteristics needed for the particular application. As is known in the art, a single Belleville washer is generally conical in cross-section and exhibits certain load/deflection characteristics based upon its thickness, material, shape, etc. When two washers are stacked so that their convex surfaces are facing in the same direction, the force (load) doubles with no increase in deflection. When two washers are stacked so that their convex surfaces are facing in opposite directions, deflection is doubled with no increase in force (load). Thus, by selecting the number of washers and the relative orientations of the selected washers, the load/deflection characteristic of the collection of Belleville washers can be varied to suit the application.

Figure 5:
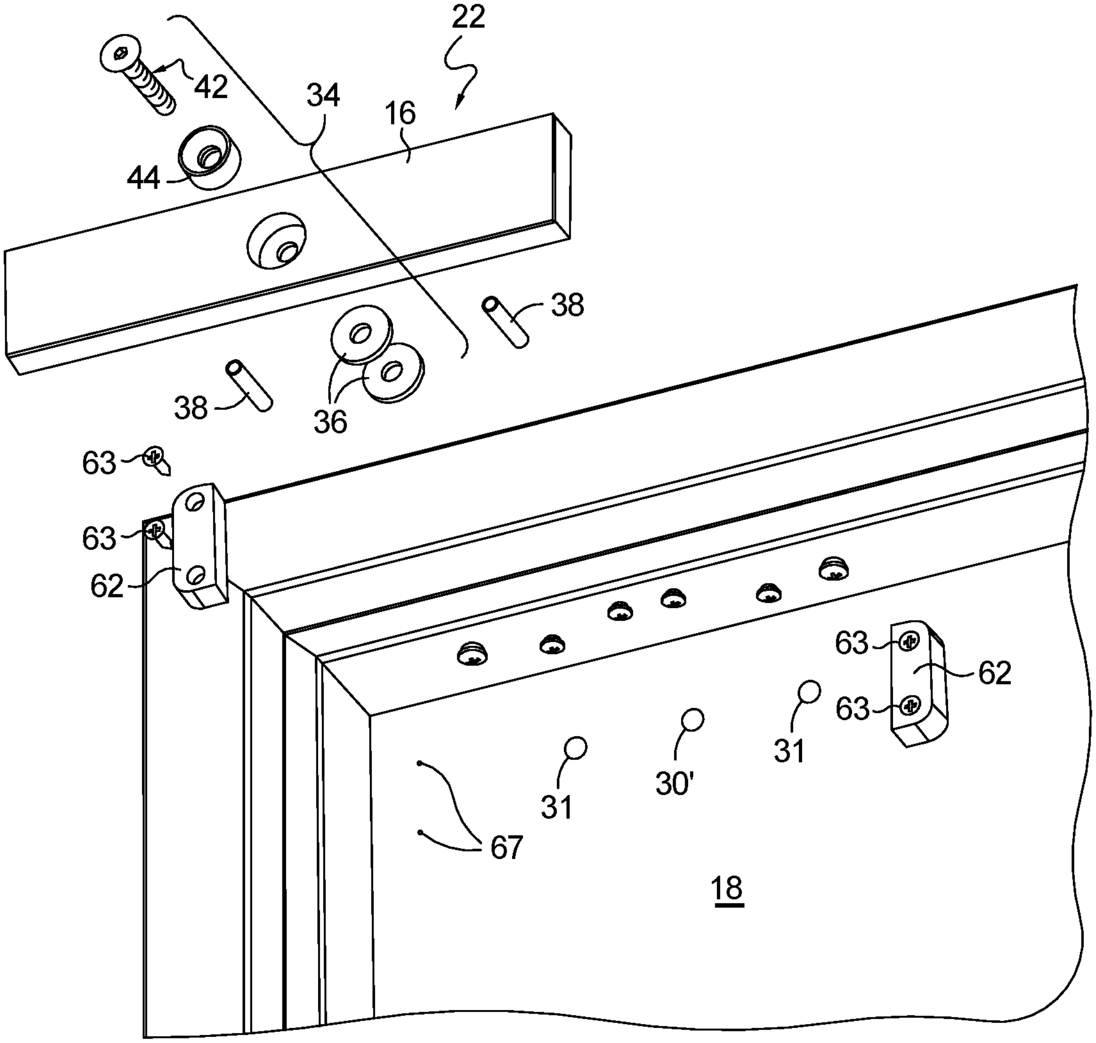
FIG. 5 is an exploded perspective view of the strike plate in accordance with the invention with one of the associated permanent magnets separately mountable/mounted to the door.
Figure 5A:
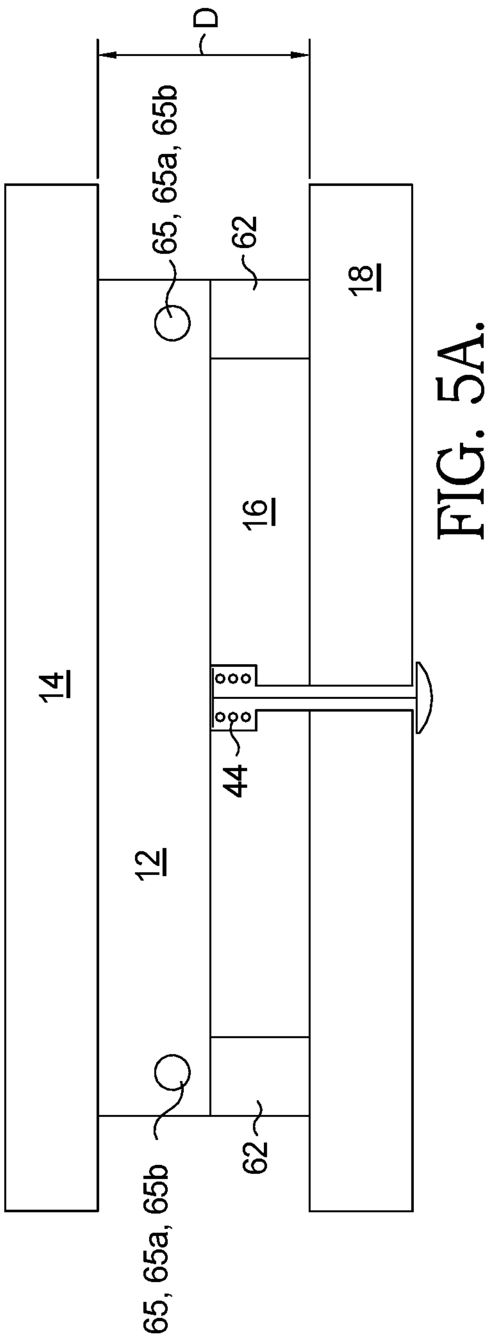
FIG. 5A is a schematic drawing of an electromagnetic door lock in a door-closed position in accordance with the invention.
Figure 5B:
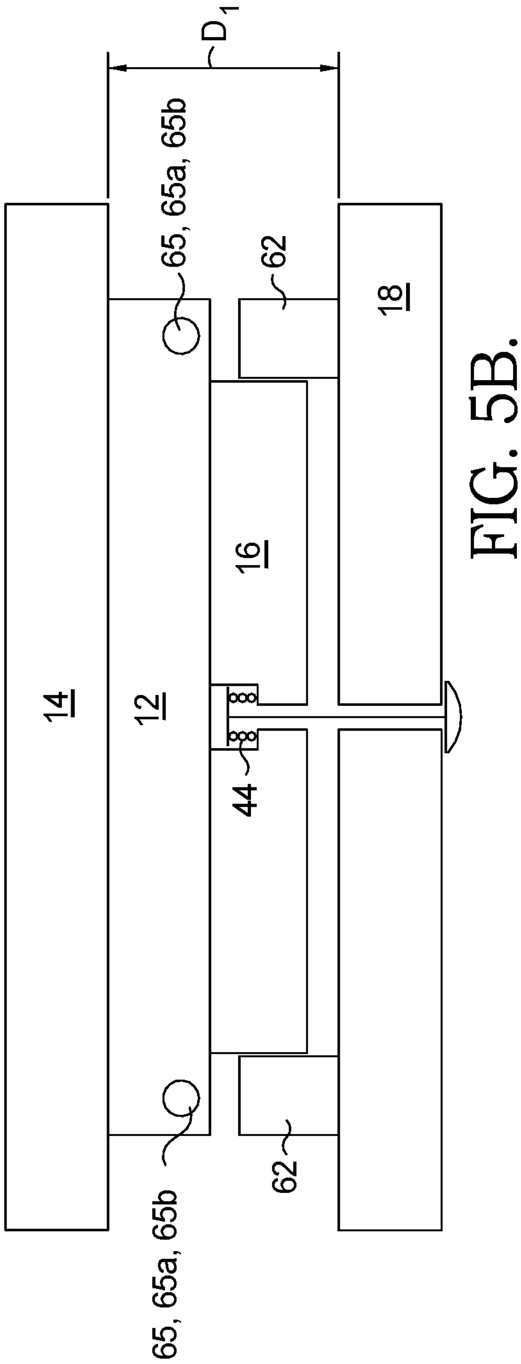
FIG. 5B is a schematic drawing of the electromagnetic door lock shown in FIG. 5A with the door opened a first distance without separation of the armature from the electromagnet in accordance with the invention.

With reference to FIGS. 5, 5A and 5B, and in accordance with the invention, one or more permanent magnets 62 is fixedly mounted directly to door 18 by fasteners 63 inserted into holes 67. (In reference to FIG. 5, one magnet (left side) is shown for mounting to the door and the right side magnet is already mounted to door 18). Each one or more magnets 62 is positioned so as to correspond to and magnetically engage with a respective sensor 65 housed within electromagnet 12 when door 18 is in the fully closed position, thereby forming a door position sensor. By way of example, electromagnet 12 may include one or more reed switches 65*a* as sensors, in or on the electromagnet, in the vicinity shown as X in FIG. 2, and excited by a respective permanent magnet 62. The one or more sensors may have a first operating condition (i.e. open or closed contacts in the exemplar reed switch) when door 18 is fully closed as shown in FIG. 5A. As the door 18 is opened while strike plate 116 remains in contact with the electromagnet (FIG. 5B), one or more magnets 62 no longer bear upon the sensor 65 causing the sensor to toggle to the opposing second operating condition (i.e. the open contacts are now closed or vice versa). The operating condition status of the sensor may be monitored by software operating in conjunction with electromagnetic lock 20, or by software provided by the user in the field, so as to sense the position of door 18 relative to door frame 14. It should be noted that, because one or more magnets 62 are fixedly mounted to door 18, door 18 may be opened a first distance—shown as $D_1$ minus D in FIGS. 5A and 5B (such as less than about ¾ inches)—due to initial compression of Belleville washer assembly 44 before strike assembly 22 begins to move away from electromagnet 12. The initial movement causes sensor 65, such as reed switch 65*a*, to toggle and to cause the software to sense an opened door state while the strike plate remains in contact with the energized electromagnet. Thus, a door-opening signal is triggered much earlier than if triggered by initial movement of the strike plate away from the electromagnet.

In the case of an electromagnetic door lock having the De-Mag design feature, compression of Belleville washer assembly 44 allows door 18 to move away from door frame 14 to thereby allow the delay function of the lock to operate. In the case of an electromagnetic door lock having an Eco-Mag design feature, compression of the Belleville washer assembly 44 allows the lock circuitry time to sense an initial unauthorized movement of the door away from the door frame (i.e., movement of the door without receipt of proper credentials) and to then provide full power to the electromagnet to keep the door in its locked state.

The one or more reed switches 65*a* discussed above may be replaced with one or more Hall Effect sensors 65*b* to provide greater sensitivity for detecting initial door movement away from the door frame in an opening direction which may be required by the Eco-Mag design feature. With greater sensitivity, a Hall Effect sensor may be capable of detecting initial door movement away from the door frame of as little as about ⅛ inch, as measured between the face of the electromagnet and the associated permanent magnet. Thus, in the case of an electromagnetic door lock having an Eco-Mag design feature, within the first ⅛ inch of door movement in the opening direction, if an unauthorized attempt to open the door is detected (the door is moved in an opening direction without proper credentials) the circuitry of the electromagnetic door lock will receive a signal from the Hall Effect sensor and provide full power to the electromagnet to prevent the door from being opened further.

Figure 6:
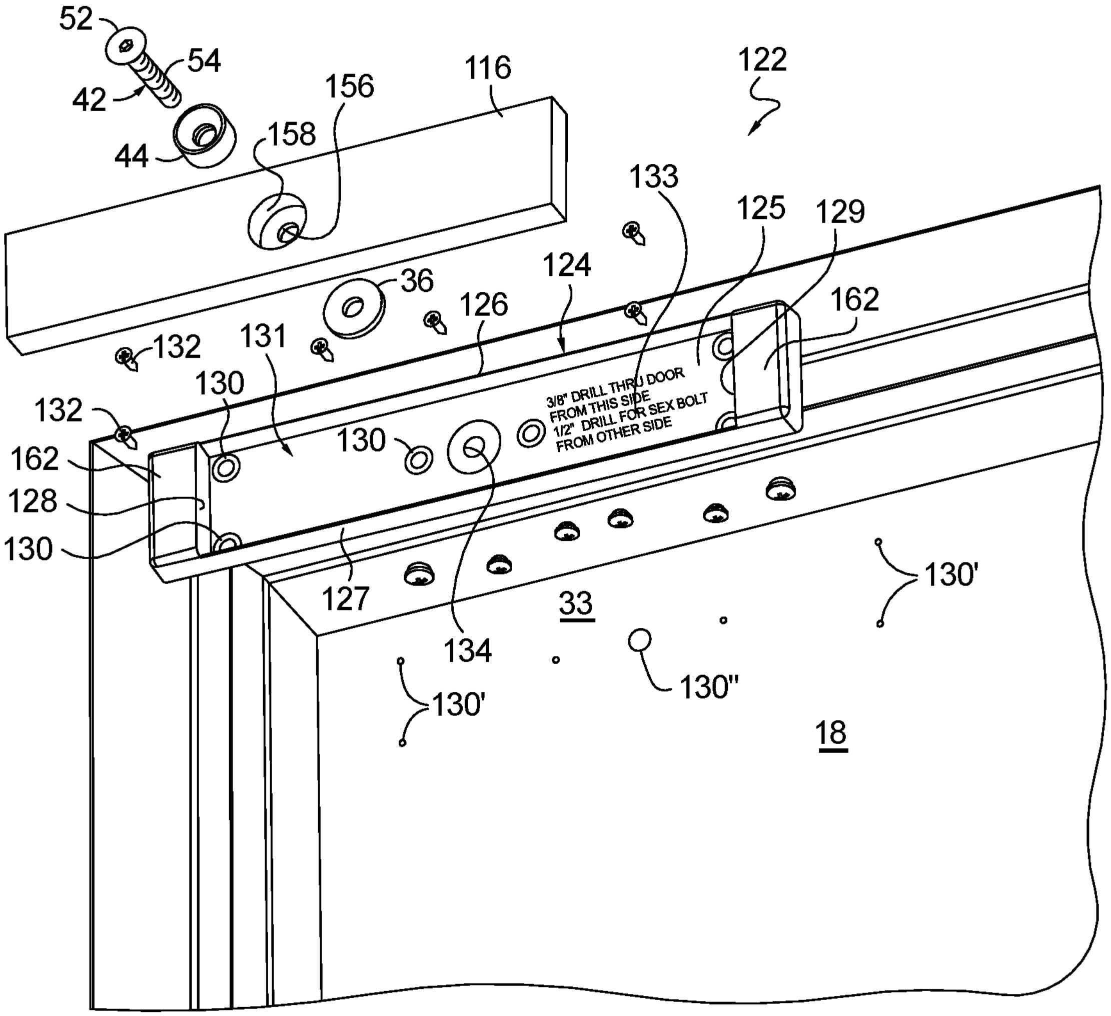
FIGS. 6 and 6A are exploded perspective views of a strike plate and tray assembly in accordance with the present invention.
Figure 6A:
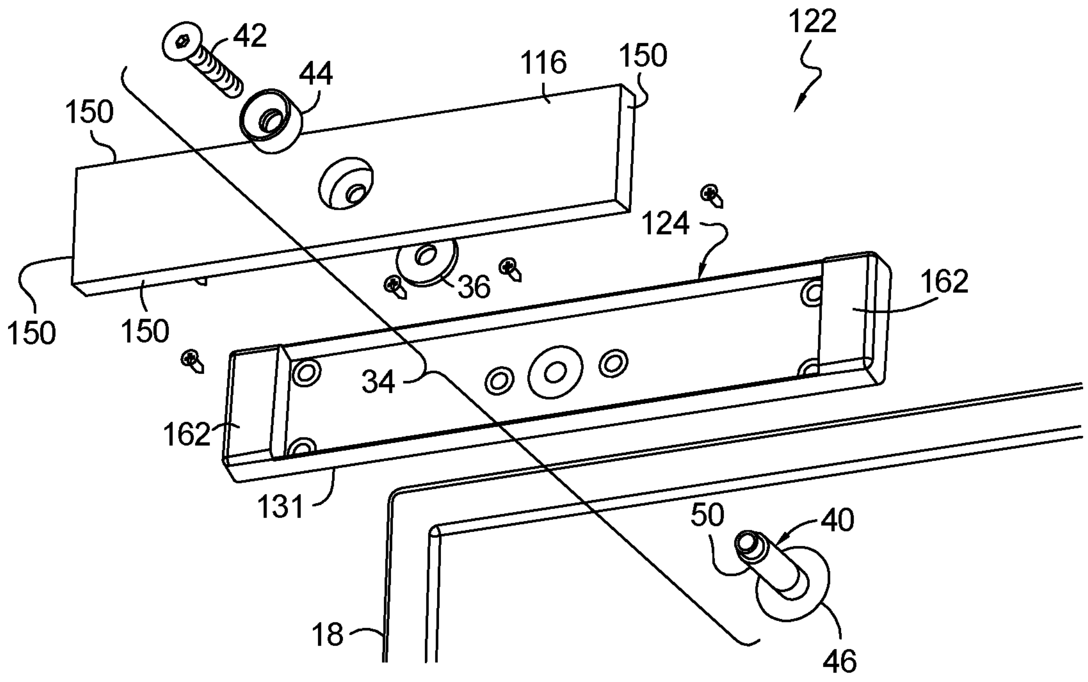

Turning now to FIGS. 6 and 6A, in accordance with a further aspect of the invention, exploded views of a strike assembly 122 are shown. Again, a complementary electromagnet (such as electromagnet 12 shown in FIG. 2), with suitable sensor 65, 65*a*, 65*b* as described above, is mounted to door frame 14 as known in the art. Strike assembly 122 is generally comprised of a strike plate 116, strike tray 124 and at least one permanent magnet 162 integrally connected to tray 124. Strike tray 124 has a back panel 125 and walls 126, 127. Opposing side edges 128, 129 abut permanent magnets 162, respectively. Walls 126, 127 and side edges 128, 129 define a cavity 131 which is proportioned to receive strike plate 116. Strike tray 124 includes a plurality of holes 130 configured to receive fasteners 132 for fixedly mounted strike tray 124 to front face 32 of door 18. As shown in FIG. 6, to properly position and orient strike tray 124, and to provide the location for pilots holes 130' within door 18 which correspond to mounting holes 130 on strike tray 124, back panel 125 of strike tray 124 may include template indicia 133 keyed to reference mounting hole locations of bracket 26.

Strike plate 116 may be movably mounted to door 18 and within strike tray 124 via strike plate mounting bolt assembly 34, as described above. It should be noted that guide pins 38 (see FIG. 4) and corresponding holes in the strike plate and door are no longer necessary. In accordance with the invention, strike plate 116 slideably resides within cavity 131 where at one or more of walls 126, 127 and side edges 128, 129 have a sufficient thickness to abut a side surface 150 of strike plate 116 such that strike plate 116 may remain within cavity 131 and in proper alignment with the door through the strike plate's movement relative to the door. This allows the body of the face plate to be unimpeded, without any holes needed to receive the guide pins. Therefore, with the greater mass due to the absence of guide pin holes, the holding force exerted on the ferromagnetic strike plate by the energized electromagnet is enhanced.

As described above, strike plate mounting bolt assembly 34 may include bolt 40, post 42 and a Belleville washer assembly 44 composed of at least one Belleville washer as described above. As seen in FIG. 6A, bolt 40 may include a flange or head 46 which abuts the rear face 48 of door 18 (see FIG. 1), and a shaft 50. Through bore 130" formed in door 18 and hole 134 in tray 124 are sized to receive an outer diameter of shaft 50. Head 46 of bolt 40 may be configured to be tamper-resistant from its exposed end.

As described above, post 42 includes head end 52 and shaft end 54 wherein the head end is larger in diameter than the shaft end. Male threads formed in shaft end 54 are configured for engagement with female threads in bolt 40. Strike plate 116 includes first bore 156 and second bore 158 larger in diameter than first bore 156. First bore 156 is sized to loosely receive shaft end 54 of post 42. Second bore 158 forms a cavity for receiving Belleville washer assembly 44 which may be comprised of one more individual Belleville washers. Each Belleville washer may be dimensioned to have an outer diameter smaller than a diameter of second bore 58 and a center hole larger in diameter than the outer diameter of shaft end 54 of post 42.

To complete the assembly of strike assembly 122 to door 18, strike tray 124 (with attached permanent magnet(s)) is first aligned with and secured to door 18. Then, bolt 40 is inserted into through bore 130" defined within door 18 and hole 134 in strike tray 124. After inserting the shaft end 54 of post 42 through each bore of the at least one Belleville washers, shaft end 54 is inserted through first and second bores 56, 58 of strike plate 116. Male threads on shaft end 54 are then threaded into female threads within bolt 40. Post 42 is then tightened into bolt 40 until opposing surfaces of the at least one Belleville washer are in contact with second bore surface 58 and the underside of head end 52 of post 42 and, preferable, until post head end 52 is flush or below the outer surface of the strike plate 116.

Strike tray 124 may include at least one permanent magnet 162 fixedly mounted thereon, as described above. Sensor 65 may include a Hall Effect sensor 65*b* positioned to be excited by magnet 162 when door 18 is in the fully closed position. Complementary electromagnet may alternatively include a reed switch 65*a* to be excited by the at least one permanent magnet 162. In the case where a permanent magnet is disposed adjacent each side wall 128, 129 of strike tray 124, any combination of reed switches/Hall Effect sensors may be incorporated in the complementary electromagnet, making the strike assembly 122 flexibly adaptable to a multitude of electromagnetic lock assemblies found in the field. For example, a first permanent magnet may be used in cooperation with a Hall Effect sensor to operate an Eco-Mag design feature while a second permanent magnet may be used in conjunction with a reed switch to operate a De-Mag design feature or to work in conjunction with another type of field-selected circuitry in need of sensing the initial movement of a door.

In FIGS. 5, 5A, 5B and 6, the "one or more" permanent magnets 62 are shown as two permanent magnets, both being fixably connectable to the door. It is understood that the invention disclosed herein also comprehends one permanent magnet being fixably connectable to the door and a second permanent magnet being fixably connectable to an end of the strike plate.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

The invention claimed is:

1. An electromagnetic door lock for selectively locking and unlocking a door to a door frame, said door being pivotally coupled to said door frame, the electromagnetic door lock comprising:

a) an electromagnet mountable to said door frame;

b) a strike plate assembly configured to be mounted to said door, said strike plate assembly comprising:

i) a strike plate configured to be movably mounted to said door; and ii) a strike tray configured to be fixedly mounted to said door and disposed between said strike plate and said door, wherein said strike tray includes a first side edge and a second side edge, wherein said first side edge and said second side edge define at least a portion of a cavity, wherein said strike plate is slidably received within said cavity, and wherein said first side edge and said second side edge each have a sufficient thickness to abut said strike plate such that said strike plate remains in alignment with said door through movement of said strike plate relative to said door;

c) at least one sensor connected to the door frame; and d) at least one permanent magnet fixedly positioned relative to said strike tray so that said at least one permanent magnet does not move relative to said strike tray, wherein said at least one permanent magnet is aligned with said at least one sensor when said door is closed, wherein movement of said door away from said door frame is detected by said at least one sensor to generate a signal, and wherein said signal is received by said electromagnet to selectively provide power to said electromagnet as a result of said movement of said door away from said door frame.

2. The electromagnetic door lock of claim 1 wherein said strike tray includes indicia.

3. The electromagnetic door lock of claim 2 wherein said indicia is instructive of proper positioning of said electromagnetic door lock.

4. The electromagnetic door lock of claim 1 wherein said at least one sensor connected to said door frame comprises a first sensor and a second sensor; and wherein said at least one permanent magnet fixedly positioned relative to said strike tray comprises a first permanent magnet located at said first side edge of said strike tray and a second permanent magnet located at said second side edge of said strike tray, wherein said first permanent magnet is aligned with said first sensor and said second permanent magnet is aligned with said second sensor when said door is closed, wherein movement of said door away from said door frame is detected by at least one of said first and second sensors.

5. The electromagnetic door lock of claim 1 wherein said first side edge and said second side edge of said strike tray have a sufficient thickness to maintain said strike plate within said cavity.

6. The electromagnetic door lock of claim 1 wherein said strike tray further includes first and second opposing walls disposed between said first side edge and said second side edge to define said cavity.

7. A strike plate assembly of an electromagnetic door lock configured to be mounted to a door, wherein said door is pivotally coupled to a door frame, wherein electromagnetic lock includes an electromagnet, and wherein at least one sensor is connected to the door frame, said strike plate assembly comprising:

a) a strike plate configured to be movably mounted to said door;

b) a strike tray configured to be fixedly mounted to said door and disposed between said strike plate and said door, wherein said strike tray includes a first side edge and a second side edge, wherein said first side edge and said second side edge define at least a portion of a cavity, wherein said strike plate is slidably received within said cavity, and wherein said first side edge and said second side edge each have a sufficient thickness to abut said strike plate such that said strike plate remains in alignment with said door through movement of said strike plate relative to said door; and c) at least one permanent magnet fixedly positioned relative to said strike tray so that said at least one permanent magnet does not move relative to said strike tray, wherein said at least one permanent magnet is configured to align with said at least one sensor when said door is closed, wherein movement of said door away from said door frame is detected by said at least one sensor to generate a signal, and wherein said signal is received by said electromagnet to selectively provide power to said electromagnet as a result of said movement of said door away from said door frame.

8. The strike plate assembly of claim 7 wherein said strike tray includes indicia.

9. The strike plate assembly of claim 8 wherein said indicia is instructive of proper positioning of said electromagnetic door lock.

10. The strike plate assembly of claim 7 wherein the at least one sensor mounted to said door frame comprises a first sensor and a second sensor, wherein said at least one magnet fixedly positioned relative to said strike tray comprises a first permanent magnet located at said first side edge of said strike tray and a second permanent magnet located at said second side edge of said strike tray, wherein said first permanent magnet is configured to align with said first sensor and said second permanent magnet is configured to align with said second sensor when said door is in a closed position relative to said door frame, wherein movement of said door away from said closed position toward an open position is detected by at least one of said first and second sensors.

11. The strike plate assembly of claim 7 wherein said first side edge and said second side edge of said strike tray have a sufficient thickness to maintain said strike plate within said cavity.

12. The strike plate assembly of claim 7 wherein said strike tray further includes first and second opposing walls disposed between said first side edge and said second side edge to define said cavity.

13. A strike plate assembly of an electromagnetic door lock configured to be mounted to a door, wherein said door is selectively movable within a door frame, said strike plate assembly comprising:

a) a strike plate configured to be movably mounted to said door;

b) a strike tray configured to be fixedly mounted to said door and disposed between said strike plate and said door, wherein said strike tray includes a cavity for receiving said strike plate, and wherein said strike tray includes a first side edge and a second side edge;

c) a first permanent magnet fixedly positioned at said first side edge of said strike tray so that said first permanent magnet does not move relative to said strike tray, wherein said first permanent magnet is configured to align with a first sensor disposed on said door frame when said door is in a closed position relative to said door frame, wherein movement of said door away from said closed position toward an open position is detected by said first sensor to generate a first signal, wherein said first sensor is a Hall Effect sensor, and wherein said first signal is received by said electromagnet to selectively provide power to said electromagnet as a result of said movement of said door away from said door frame; and d) a second permanent magnet fixedly positioned at said second side edge of said strike tray so that said second permanent magnet does not move relative to said strike tray, wherein said second permanent magnet is configured to align with a second sensor disposed on said door frame when said door is in said closed position relative to said door frame, wherein movement of said door away from said closed position toward said open position is detected by said second sensor to generate a second signal, wherein said first second sensor is a reed switch, and wherein said second signal is received by said electromagnet to selectively provide power to said electromagnet as a result of said movement of said door away from said door frame.

14. The strike plate assembly of claim 13 wherein said strike tray includes indicia.

15. The strike plate assembly of claim 14 wherein said indicia is instructive of proper positioning of said electromagnetic door lock.

* * * * *